INVENTOR.
Allan Broms

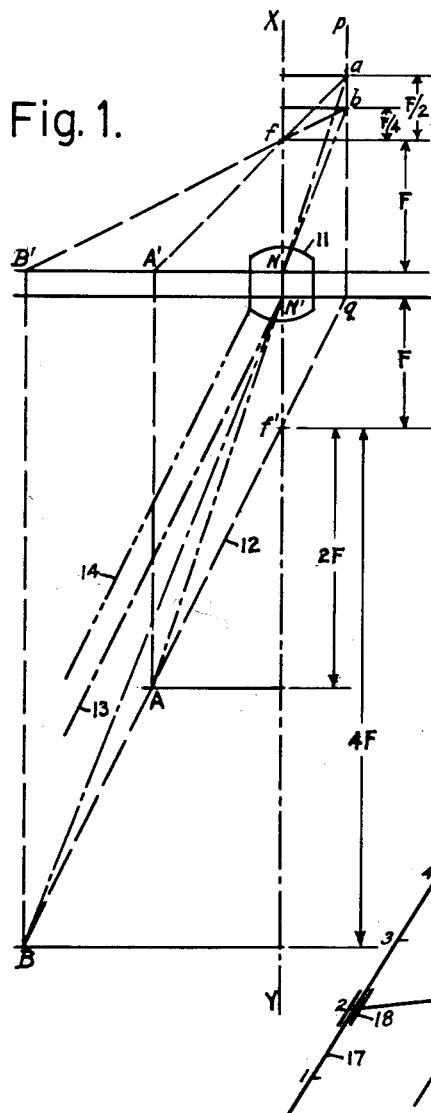
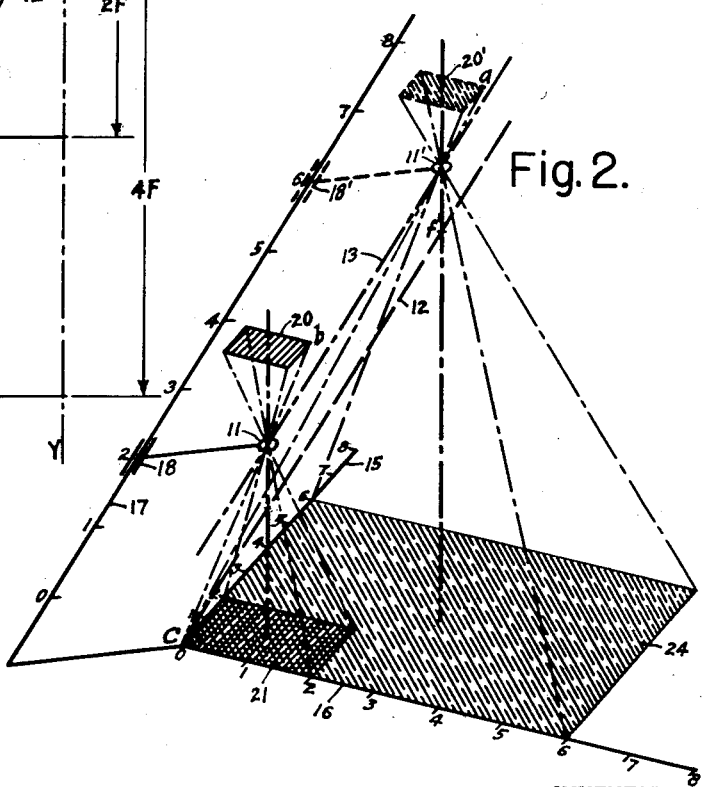
INVENTOR.
Allan Broms

Dec. 4, 1956 A. BROMS 2,772,599
METHOD OF SETTING THE ELEMENTS OF AN OPTICAL SYSTEM AND
PROJECTOR AND COPYING CAMERA FOR PERFORMING THE SAME
Filed June 3, 1950 3 Sheets-Sheet 3

INVENTOR.
Allan Broms
BY
ATTORNEY

United States Patent Office 2,772,599
Patented Dec. 4, 1956

2,772,599

METHOD OF SETTING THE ELEMENTS OF AN OPTICAL SYSTEM AND PROJECTOR AND COPYING CAMERA FOR PERFORMING THE SAME

Allan Broms, New York, N. Y.

Application June 3, 1950, Serial No. 165,937

8 Claims. (Cl. 88—24)

This invention relates to an optical system of projectors and copying cameras embodying a field, a limiting aperture, and an interposed lens.

In the projection of a rectangular field image or a photographic copying of such an image, it is well known that the frame edges of the limiting aperture as projected through the lens to the field plane determine the edges or limits of the field which will be photographed or projected. It is this limited area which is hereinafter referred to as the field.

To preserve accurate definition of the frame image in photography, or like definition in the field image when projecting, it is necessary that the frame and field planes be maintained in mutually conjugate focus and this should prevail at all relative distances between the lens and frame and the lens and field.

While these factors have been long understood, there has heretofore been no simple, convenient, positive and accurate method or means whereby the relative positions of the aperture frame, lens and field may be adjusted to get a desired field position, size or ratio of reduction or magnification.

The primary object of this invention is to provide such a method and mechanical means for so doing.

The accompanying drawings show various forms of apparatus for practicing the method of this invention, but the method may be practiced with other apparatus and with manual manipulation. The apparatus shown is for purpose of illustration, only, and does not define the limits of the invention.

Figure 1 shows a standard graphic diagram for determining conjugate image planes of an optical system.

Figure 2 is a diagrammatic perspective view graphically illustrating the method of the present invention.

Figure 3:
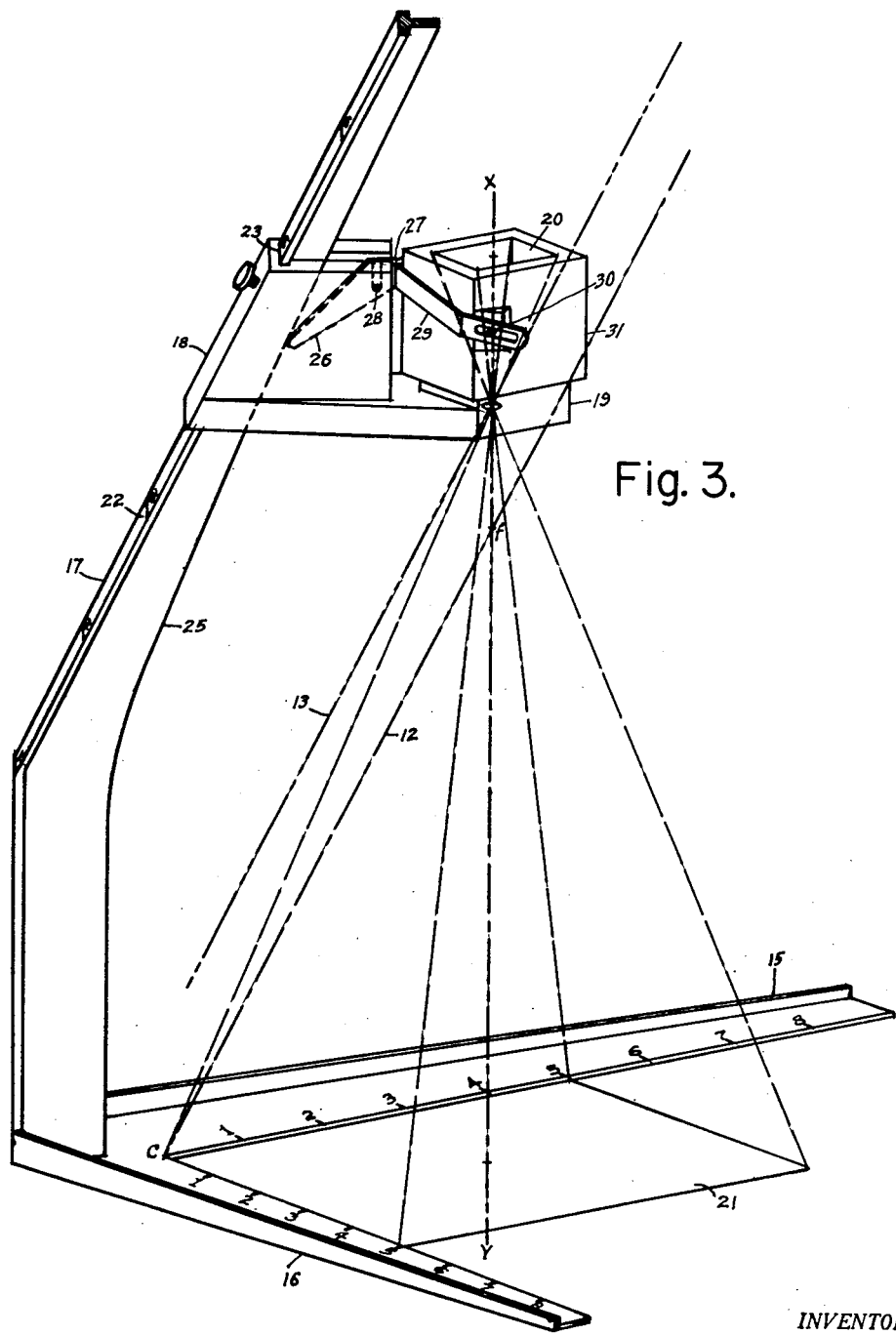
Figure 3 is a perspective view of one form of apparatus embodying the present invention.

Upwardly of a century ago one K. F. Gauss formulated the theory of optical image formation illustrated in the standard graphic diagram shown in Figure 1.

In this diagram the positive lens 11 has the optical axis X—Y, and in said axis the nodal points N and N' and the principal focal points $f$ and $f'$ distant respectively from said nodal points by the lens focal length F. Normal to said axis are nodal planes through N and N'. The image planes herein referred to are likewise normal to the optical axis, each being defined by any single point through which its passes.

By definition, light rays parallel to the optical axis on one side of the lens are refracted by the lens so as to converge to and pass through the principal focal point on the opposite side, and vice versa.

From some point $a$ remote from the optical axis in a given image plane $a$, are drawn two lines representing rays; one $a$—$q$ is parallel to the optical axis X—Y and extends to an intersection with the opposite nodal plane N', while the other $a$—A' extends through the near principal focal point $f$ to an intersection with the near nodal plane N. By ignoring the actual size of the lens opening, these two rays are considered as proceeding, after refraction, respectively, through the opposite principal focal point $f''$ ($q$—$f'$—A, etc.), and parallel to the optical axis (A'—A), converging at a common point A defining the desired image plane A conjugate to the given image plane $a$. In a similar manner, a point $b$, equivalent to point $a$ in any other image plane $b$, is projected along two ray paths, respectively $b$—$q$—$f'$—A—B and $b$—$f$—B'—B to convergence at B, determining the desired conjugate image plane B.

For more than a century, in this and derivative forms, this conventional graphic diagram has been constantly used for portraying the basic relationship between conjugate image points or planes.

I have discovered that, if the limiting aperture of a projector or copying camera is moved rectilinearly of the optical axis relative to the lens, any point in its periphery will move along a locus line, such as $p$—$a$—$b$—$q$, parallel to the optical axis, and corresponding to the path of the ray $a$—$b$—$q$ which, after refraction, follows the straight-line $q$—$f'$—A—B passing through the opposite principal focal point $f'$. From the conventional diagram we can also derive the fact that the other rays passing through the principal focal point $f$ from the respective image positions $a$, $b$, etc., will also be refracted to converge at conjugate focal points A, B etc., always in the straight line $q$—$f'$—A—B. This straight line is therefore the field locus of the given aperture point movement projected conjugately through the lens. For convenience I will call it the "field locus line" and designate it by 12 in Figure 1.

According to this invention I may utilize one given point in the periphery of the limiting aperture or frame, such as one corner thereof, and move the frame rectilinearly of the optical axis, then project that point through the lens to conjugate focal points along the field locus line 12. In this situation I move the field relative to the line so that the conjugate field corner is shifted along said line 12 shown in Figure 1. Or, conversely, as in Figure 2, the field corner C is held fixed, the lens 11 moved along a lens locus line 13 parallel to the field locus line 12, and the given aperture corner moved relative to the lens 11 parallel to the optical axis to the suitable conjugate focal position. As shown in both Figures 1 and 2, the lens locus line 13 is parallel to the field locus line 12 and is spaced therefrom along the optical axis a distance equal to the focal length F of the lens.

From each position of an aperture point $a$, $b$, etc., a cone of rays proceeds to the opening of the lens, is refracted, and then converges to its conjugate focal point A, B, etc.

For convenience, each such group of rays may be represented by the path of its axial ray passing through the nodal points of the lens, as $a$—N—N'—A, $b$—N—N'—B, etc. in Figure 1. In each instance, the portions of such a path outside the lens are parallel, separated by the internodal distance N—N'. For purposes of simpler further illustration, however, this internodal space will merely be assumed, and the projection of each aperture image point represented by a straight line through the center of the lens to its conjugate field image point, as in Figures 2 to 4 inclusive.

In Figures 2 and 3, I have indicated and shown a stand consisting of two straight bars 15 and 16 serving as the spreading feet of a base, and a straight inclined guide beam 17 extending upward therefrom and serving as support for a sliding bracket 18 holding the camera or projector 19. The two feet 15 and 16, the common bottom plane of which establishes the field plane, are so positioned that their inner edges extend from the field locus point C at right angles to each other and parallel to the respective side and end edges of the camera or projector aperture or frame 20, thus serving to define two adjacent edges of the field 21. The field locus point C is located in the field locus line 12, which as hereinbefore explained, passes through the focal point $f'$.

The two feet 15 and 16 are respectively graduated in scale unit intervals equal to the respectively parallel edges of the frame 20, with the zero point of each scale at the field corner C.

The plane including the field locus point C and the optical axis of Figures 2 and 3 corresponds to the plane of Figure 1, and includes parallel diagonals of the frame and field. From the principal focal point of the lens on the field side thereof and in this plane, the field locus line 12 extends downwardly over the field at that angle to the optical axis whose tangent equals the distance of the corner $a$ of the frame from the optical axis divided by the focal length F of the lens. In this same plane, parallel to the field locus line 12 and above it by the distance F, measured parallel to the optical axis, extends the lens locus line 13, so named because it is followed by the lens (more specifically by its nodal point N') in this form of mounting.

Rigid with the feet 15 and 16 of the stand, the straight support beam 17 extends in an upwardly inclined direction, parallel to the field locus line 12 and the lens locus line 13, but sufficiently remote from them to provide the clearance necessary for the structural members of the camera or projector. Along this support beam slides a bracket 18 to which the lens 11 is affixed in such relation that its nodal point N' is in the lens locus line 13. Consequently the movement of the bracket 18 along the support beam 17 causes the nodal point N' to move upwardly or downwardly in relation to the field plane 21, but always following the lens locus line 13 precisely.

The support beam 17 has a graduated scale 22, the vertical unit intervals of which equal the focal length F of the lens measured parallel to the optical axis. The zero of this scale is placed at the position of a marker 23 on the lens bracket 18 when the point $f'$ is at field corner C, i. e., when the nodal point N' is above the field plane 21 by exactly the distance F. The scale division numbers, in upward order, then indicate the proper positions for the lens bracket marker 23 to secure desired ratios of reduction or enlargement.

If at any given position of the bracket 18 and lens 11, the frame 20 be moved parallel to the optical axis upward or downward in relation to the lens, such a proper conjugate position can be found as to bring the frame plane into suitable focus. When the frame plane is so focused, the edges of the frame will be projected through the lens to exact coincidence with the edges of the field as defined by the inner edges of the feet 15 and 16 of the stand and the points thereon corresponding to the point of the scale 22 on the support beam 17 indicated by the position of the lens bracket marker 23.

Figure 2 shows the lens bracket in two positions 18 and 18' on the support beam 17, the bracket being at positions 2 and 6 respectively on the support beam scale 22. Corresponding fields 21 and 24 are indicated on the inner edges of the 15 and 16 by the respective scale points 2 and 6 thereof. For every focal distance of the field plane, e. g., $1F+F$, $2F+F$, $3F+F$, etc., there is a conjugate focal distance of the frame plane $F+F/1$, $F+F/2$, $F+F/3$, etc., corresponding to ratios of reduction from field to frame of 1:1, 2:1, 3:1, etc., or to inverse ratios of enlargement from frame to field. In the illustrative showing of Figure 2, the ratios of reduction are respectively 2:1 and 6:1, and the ratios of enlargement 1:2 and 1:6, precisely as indicated by the numbers read on scales of the support beam 17 and on the feet 15 and 16.

A correspondingly numbered scale may be used for setting the frame at correct conjugate focal positions by hand, or mechanical means may be provided for doing the same automatically, as the lens bracket 18 is moved along the support beam 17. In Figure 3, such illustrative means are shown as consisting of a cam surface 25 along one side of the support beam 17, actuating a follower arm 26 of a bell crank 27 mounted on the horizontal pivot 28, the other arm 29 of the bell crank constituting a fork engaging two pins 30 on opposite side of a movable member 31 of the camera or projector chamber. This member contains the frame aperture 20 and the several parts of this mechanism are so dimensioned that movement of the bracket along the support beam results in movements of the frame plane to the focal distances from the nodal point N of the lens corresponding to the respective conjugate focal distances of the field plane from the nodal plane N' of the lens. Any other appropriate means for such coordinate maintaining of the frame and field planes in conjugate focus may be used, the one shown being merely illustrative.

It should be noted that focusing is effected, not by movement of the lens, but by movement of the frame plane. More specifically, the nodal point N' of the lens follows accurately the straight lens locus line 13, i. e., its path must be parallel to the support beam 17. This can best be done by mounting the lens fixedly in the bracket 18 which slides along the support beam 17 and then focusing by movement of the frame member 31 relative to the lens and in a direction parallel to the optical axis of the latter.

This construction differs diametrically from that of the ordinary camera or projector in which the frame member is mounted in direct relation to the usually vertical support beam, the focusing being then effected by moving the lens in relation to the frameplane. Even if such ordinary camera or projector were mounted thus on an inclined support beam with the frame moving parallel thereto, the lens would depart from such parallel movement as it moved up or down in relation to the frame. It would in fact move along a curved line instead of parallel to the straight field locus line, causing every point in the field to shift in relation to the base of the stand. To correct for that shift, so as to use the base as a guide to the field limits, would require an intricate compensating mechanism. All this is obviated by moving the lens in fixed parallel relation to the straight sloping support beam, and focusing by movement of the frame instead of the lens.

In using my invention for copying purposes the copy to be photographed is placed in the corner between the two feet 15 and 16, with their scale edges along the two adjacent edges of the field to be covered. The scale numbers at the two opposite edges of the field are then read and the larger number employed because it includes the smaller. The bracket marker 23 is then set to the corresponding number on the scale 22 on the support beam 17, bringing the lens to the correct position. Meanwhile the automatic focusing mechanism cam 25, acting through the bell crank 27, brings the frame to correct position, causing the indicated field to be conjugately projected precisely upon the frame aperture. In enlarging projection, the projector can be in like manner adjusted in position and focus, merely by placing the sensitized paper in the corner between the feet, determining the field limits by the inner edges of the feet and the scale numbers thereon, then moving the bracket along the support beam to the corresponding scale point, the film frame aperture being then precisely projected to the field limits thus indicated.

Figure 4:
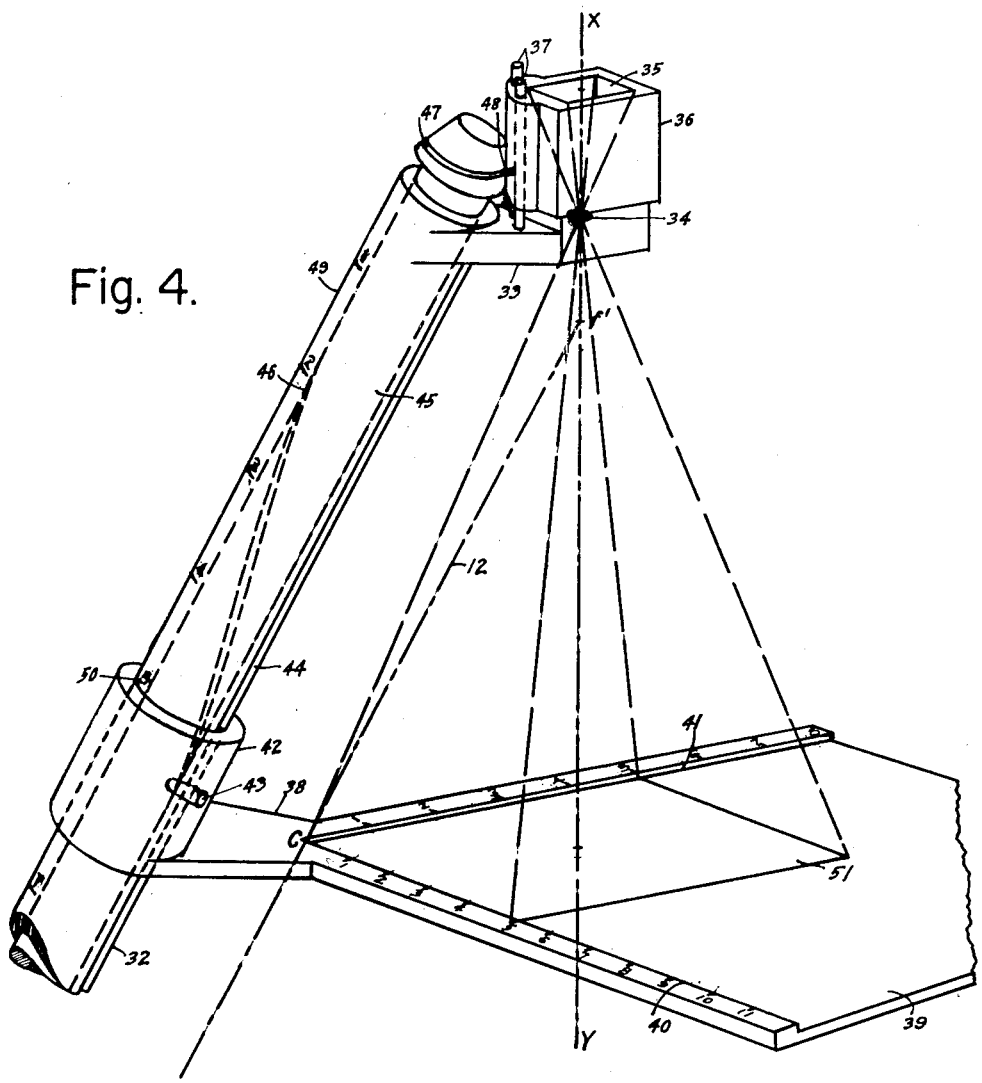
Figure 4 shows another form of apparatus embodying the present invention, the same being illustrated in perspective.

Figure 4 shows in perspective another form of my invention in which the field corner C is moved along the field locus line 12 instead of the lens moving along the parallel lens locus line 13.

In this form, a tubular support beam 32 is mounted at the same inclination and parallel to the field locus line 12 on a table or other base not shown. At its upper end is attached a fixed bracket 33 in which is fixedly mounted the lens 34. The frame aperture 35 is part of the member 36, slidably mounted on the guides 37 of the bracket 33 for movement of the aperture 35 relative to the lens 34 parallel to the optical axis X—Y thereof.

The bracket 38 has a depressed tabular surface 39 with two edge ledges 40 and 41 at right angles to each other, meeting at point C in the field locus line 12, and parallel respectively to the edges of the frame aperture 35, and having thereon scales equivalent to those on the feet 15 and 16 of Figure 3. The surface 39 provides the field plane on which the copy 51 to be photographed, or the sensitized paper to be printed upon, are placed as in Figure 3.

The bracket 38 has a sleeve 42 embracing and slidably mounted for movement along the beam 32. The pin 43, fixed in said sleeve 42, engages a straight slot 44 in the wall of the beam 32 to prevent relative rotation and thereby maintain parallelism of the edges 40 and 41 with the edges of the frame 35 at all times.

Within the support beam 32 is a rotatable rod 45. Said rod has formed therein a helical slot 46 engaged by the inner end of the pin 43 in such manner that, as the bracket 38 is raised or lowered, the rod is caused to rotate. At its upper end, this rod has an enlarged head in which is formed a cam slot 47 engaging a pin or follower 48 fixed to the member 36. As the rod and cam are rotated by the pin 43, the member 36 and its frame aperture 35 are raised or lowered on the guides 37 relative to the lens 34. The several parts of this mechanism are relatively so dimensioned that movement of the field corner C along the field locus line 12, by movement of the bracket 38 along the support beam 32, causes the frame aperture 35 to move parallel to the optical axis X—Y to focus conjugately with the field plane. Thereby two edges of the frame aperture will be constantly and accurately projected to the field edges 40 and 41. To facilitate ready placing of the surface 39 relative to copy size, desired ratio of reduction or enlargement, etc., the beam 32 has a graduated scale 49 for setting of the marker edge 50 of the bracket 38 to positions proper to the field limits shown along the scales of the edges 40 and 41.

It will be apparent from the foregoing detailed description that the essential purpose of this invention is to so move frame and field in relation to the lens and to each other that, while maintaining them in conjugate focal relations, a point in the periphery of the frame, such as a corner thereof, shall be projected constantly through the lens to a fixed point in the field plane.

In my invention the movement of the frame and lens is rectilinearly of the optical axis. If the field is to be moved, the given corner of the field must be moved along a straight path, herein described as the field locus line, which passes through the principal focus of the lens on the field side. In the event that the lens is moved, said lens must be moved along a straight path, herein defined as the lens locus line, which line is parallel to the field locus line and is spaced therefrom a distance equal to the focal length of the lens measured parallel to the optical axis. Bearing these facts in mind, it will be apparent to those skilled in the art that the present invention embodies marked novelty and utility and is a departure from all prior procedure.

I am of course aware that it has heretofore been proposed to use inclined supporting beams or standards to support a camera or enlarger above a field for various purposes, mainly to afford clearance for a field that becomes larger as the lens is raised.

The desideratum of fixation of the field at a particular point has long been recognized and George Denis, French Patent No. 668,689, published November 5, 1929, apparently seeks to accomplish this result, for the patent states that the optical center of the instrument is adjusted following a ray marginal to the field. However, it is clear from this French patent that Denis moves his lens along a straight line path which extends from one edge or corner of the field through the lens itself.

In contradistinction to the Denis disclosure, when I move the lens, that movement is along a straight line path (denoted in the foregoing specification by the reference character 13) which does not pass through the point of fixation in the field, but is rather displaced therefrom along the optical axis a distance equal to the focal length of the lens and parallel to that line (which I term the field locus line) which extends from the point of fixation to the principal focal point of the lens.

The path followed by the Denis lens would correspond in my drawings to the line N'A or N'B (both in Figure 1), while my path of movement of the lens is the line 13, or if the movement is by the field corner then that movement is along the line 12. Neither of these lines 13 and 12 do or can correspond with the lines N'A or N'B which latter lines are according to the Denis teachings.

The difference between the disclosure of the present invention and the Denis disclosure is the difference between success and failure. By my method and apparatus positive fixation is attained and that cannot be obtained according to the Denis teachings. The difference is not merely a difference in angle or a variation in degree. The difference is a difference in kind. My line 12 must pass through the principal focal point of the lens. My line 13 must be remote from the point to be fixed in the manner which I have hereinbefore indicated. It can be optically proven mathematically, as well as by practical application, that the Denis system cannot accomplish the results which are accomplished by the present invention. That the change which I have made is not an obvious one is effectually established by the fact that the art has been striving for decades to accomplish the results which are accomplished by the present invention, but without success. The method and apparatus of this invention for the first time permits of accurate and positive fixation. It has no antecedent in the art capable of this result.

This invention should not moreover be confused with the disclosure of the Woldemar Hagele German Patent No. 566,122, issued December 10, 1932. While that patent discloses an inclined supporting beam for the camera, the patentee places this beam at an arbitrarily assumed angle and then builds the rest of his apparatus about that angle. To determine the exact angle required for fixation of a field corner or other peripheral point of the field, the distance of the corresponding frame peripheral point from the optical axis must be used. Hagele, however, does not even refer to any such frame or field points. His patent contains absolutely no teaching of the present invention or how to practically perform the same to obtain the fixation to which I have referred.

Among the advantages resulting from my invention, are the following:

The field to be covered can be simply and positively determined, two adjacent edges thereof being placed along the inner edges of the right-angled base, the two opposite edges of said field being indicated or determined by scales along said inner base edges.

The adjusting of the camera or projector for covering such field or securing any desired ratio of reduction of enlargement is done simply and positively by moving a bracket along a straight support beam to a scale setting indicating such field or ratio.

Suitable correlatives scales or simple automatic means provide for instant and precise conjugate focusing of field and frame for any such ratio or any desired field size.

The foregoing description sets forth the invention in its preferred practical form, but the invention is to be understood as fully commensurate with the appended claims.

This application is a continuation-in-part of application Serial No. 606,904, filed July 25, 1945 and abandoned in favor of the present application.

Having thus fully described the invention, what I claim as new and desire to secure by Letters Patent is:

1. The herein described method of adjusting to conjugate focus a limiting frame aperture and a field locating member arranged along the optical axis and at the opposite sides of an interposed lens which comprises: relatively moving the frame aperture and the lens rectilinearly of the optical axis and relatively moving the lens and field locating member parallel to a straight line drawn from the principal focal point of the lens on the field side thereof to a point in the periphery of the field image of the aperture as projected through the lens when the planes of said field and aperture are in conjugate focus.

2. The herein described method of setting the elements of an optical system arranged along an optical axis which includes a lens, a limiting frame aperture at one side of the lens, and a field locating member at the opposite side thereof, which comprises: relatively moving the aperture and the lens rectilinearly of the optical axis, and relatively moving the lens and the field locating member to produce a conjugate focus between the planes of the aperture and the field, the relative movement between the lens and field locating member being parallel to a straight line drawn from the principal focal point of the lens on the field side thereof to a point in the periphery of the field image of the aperture as projected through the lens when the planes of the field and the aperture are in conjugate focus.

3. The herein described method of setting the elements of an optical system arranged along an optical axis which includes a lens, a limiting frame aperture at one side of the lens, and a field locating member at the opposite side thereof, which comprises: relatively moving the field locating member and the lens parallel to a straight line drawn from the principal focal point of the lens on the field side thereof to a point in the periphery of the field image of the aperture as projected through the lens when the planes of the field and aperture are in conjugate focus, and relatively moving the aperture and the lens rectilinearly of the optical axis to produce a conjugate focus between the planes of the aperture and the field.

4. In an assembly of the character described, an optical system comprising: a lens, a frame member provided with a limiting aperture at one side of said lens, a field locating member at the other side of said lens, means for guiding the frame member aperture for focusing movement relative to and axially of the lens, said field locating member and lens being relatively movable with respect to one another, and a straight supporting guide for directing movement of at least one of said lens and field member parallel to a straight line drawn from the principal focal point of the lens on the field side thereof to a corner of the field image of the aperture as projected through the lens when the planes of said aperture and field are in conjugate focus.

5. In an assembly of the character described, an optical system comprising: a lens, a frame member provided with a limiting aperture and movable axially of the lens, a field member to locate the field plane of focus conjugate to the limiting aperture of the frame member and having means to indicate the position of the conjugate image of one edge of said aperture as projected through the lens, a straight guiding member parallel to a straight line in a plane including the optical axis and a point in said edge of said aperture and at that angle to the optical axis whose tangent equals the distance from the optical axis to said edge point divided by the focal length of the lens, and a carrier for said lens movable longitudinally of said guiding member and provided with means guiding movement of the frame member axially of the lens to conjugate focus with the field plane.

6. In an assembly of the character described, an optical system comprising: a lens, a frame member provided with a limiting aperture and movable axially of the lens, a field member to locate the field plane of focus conjugate to the limiting aperture of the frame member and having means to indicate the positions of the conjugate images of two intersecting edges of said aperture as projected through the lens, a straight guiding member parallel to a straight line in a plane including the optical axis and the intersection of said edges of said aperture and at that angle to the optical axis whose tangent equals the distance from the optical axis to said intersection point divided by the focal length of the lens, and a carrier for said lens movable longitudinally of said guiding member and provided with means guiding movement of the frame member axially of the lens to conjugate focus with the field plane.

7. An assembly according to claim 4, wherein the lens and the frame member are supported on a carrier movable longitudinally of the straight supporting guide.

8. An assembly according to claim 4, wherein the field locating member is supported on a bracket movable longitudinally of the straight supporting guide.

References Cited in the file of this patent

UNITED STATES PATENTS

| 2,428,627 | Kalman | Oct. 7, 1947 |

FOREIGN PATENTS

| 668,689 | France | July 16, 1929 |
| 566,122 | Germany | Dec. 10, 1932 |
| 768,557 | France | May 22, 1934 |